United States Patent [19]

Sers

[11] Patent Number: 4,544,807

[45] Date of Patent: Oct. 1, 1985

[54] FAULT DETECTOR TEST INSTRUMENT

[76] Inventor: Gilbert L. Sers, 648 Martense Ave., Teaneck, N.J. 07666

[21] Appl. No.: 503,729

[22] Filed: Jun. 13, 1983

[51] Int. Cl.$^4$ .............................................. H04B 3/46
[52] U.S. Cl. ......................... 179/175.11; 129/175.3 F
[58] Field of Search .................. 179/175.3 F, 175.3 R, 179/175.25, 175, 175.11; 324/52

[56] References Cited

U.S. PATENT DOCUMENTS 3,976,849  8/1976  Champan ..................... 179/175.3 R
4,197,435  4/1980  Jackson et al. ............... 179/175.3 R

*Primary Examiner*—Stafford D. Schreyer
*Attorney, Agent, or Firm*—Robert I. Pearlman

[57] ABSTRACT

A fault detection and locating test instrument for indicating wiring and station equipment faults on telephone lines, such as grounds, foreign batteries, resistance across lines, and open circuits. It can be portable or wired, and required no internal power source. Visual display or detected faults are by means of light-emitting diodes. A feature of the instrument is an output circuit including a pair of connected transistors associated with light-emitting diodes for indicating current flow or lack thereof, and a capacitor-diode circuit for indicating presence of an alternating current at the output terminals. An input test circuit also provides an indication of the presence of the normal voltage and its polarity supplied by the telephone company. A jack connection is provided for to enable normal use of the lines when the instrument is connected and as fault appears at the output. A reversing switch in the output can be used to test the telephone set capacitor to determine whether or not the line is open.

7 Claims, 1 Drawing Figure

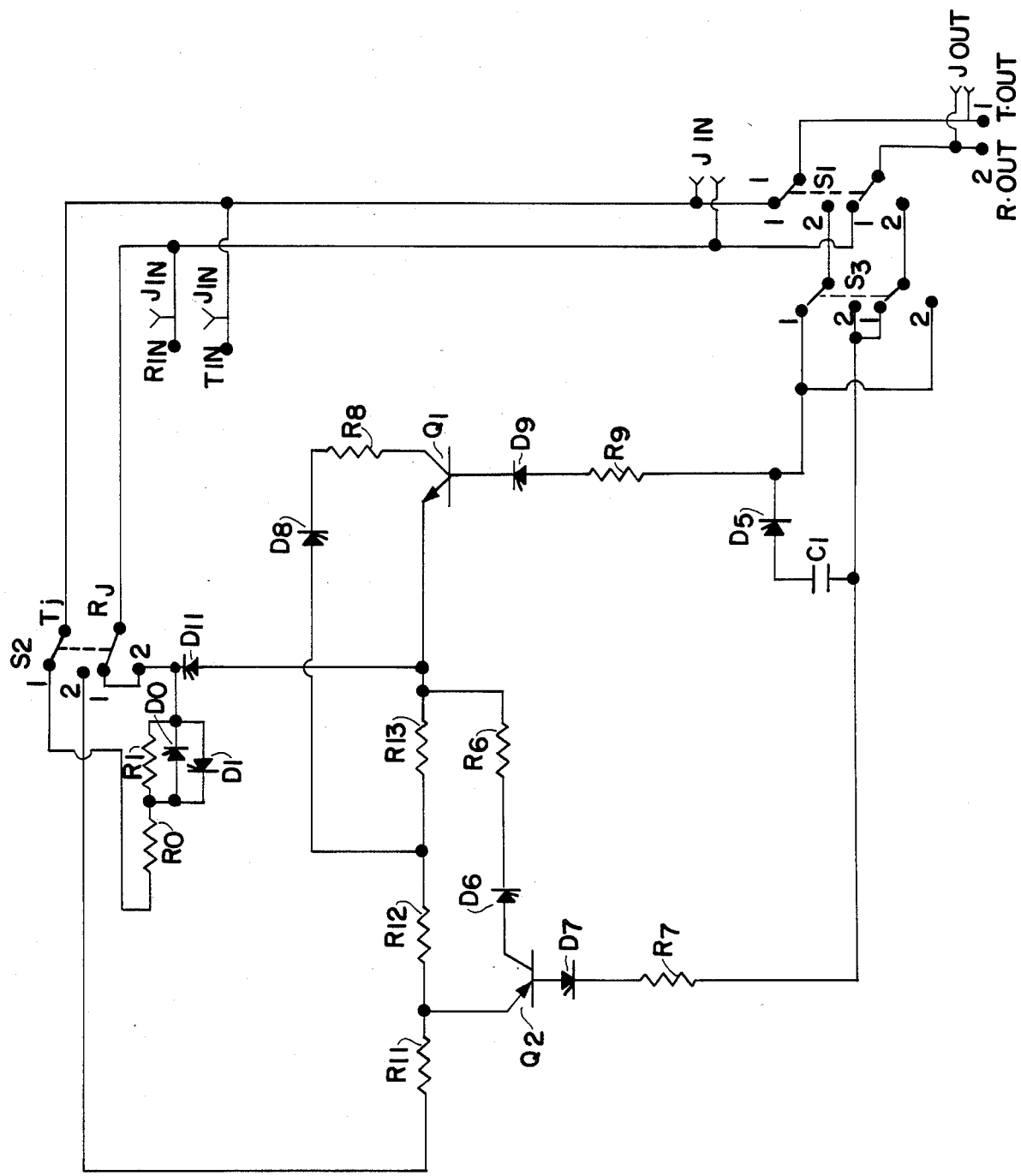

FAULT DETECTOR TEST INSTRUMENT

BACKGROUND OF THE INVENTION

The present invention relates to a test instrument which includes testing circuitry which can be inserted between the input and output sides of telephone subscriber lines for indicating wiring and station equipment faults on the telephone lines and determining the direction of such faults. It is an interface between the telephone supply company and the equipment and circuits which the customer provides. This instrument provides means whereby the user can test that portion of the circuit which he is required to maintain and also check the input to the circuit for proper voltage and polarity. By means of the present instrument, there is provided an indication of the most common wiring faults which occur, such as grounds, foreign E.M.F., resistance across the lines, open circuits, etc. A feature of the present instrument is that it may be portable or wired and requires no internal power source. It uses light emitting diodes to provide convenient visual display of any faults detected.

As the telephone industry has been changing in recent times, it has become common for customers to use more of their own equipment and to do a greater amount of their own wiring, instead of relying on the telephone company. There exists a need for devices which can aid and assist the relatively unskilled and unprofessional people in recognizing problems which can affect their telephone service. These people should be able to identify the source of the problem and correct it or, at the very minimum, be able to identify those areas which may be responsible for causing the fault and determine what they believe to be the appropriate procedure in order to correct the fault. This would eliminate many calls to the telephone company for service, for which the customer is billed. Another problem is that on many occasions when the problem is not the responsibility of the telephone company, the service is not restored and the problem remains.

At the present time devices which are used to identify faults on telephone lines are intended primarily for use by professional or skilled operators. These devices typically include a variety of devices such as meters, LED indicators and opening demarkation blocks. The meters usually require knowledge of their operation and interpretation of the measured results in order to use them properly. The LED indicators which are normally employed are inserted into the line and test for various conditions at that point. The indicators cannot segregate sections of the circuit so that the particular location of the fault is well defined, nor do they indicate the direction of the fault. These indicators commonly require manipulation of various connections in order to obtain an accurate indication of the fault, which in turn requires a keen knowledge and certain skill to attain that result.

Other typical prior art is exemplified by the U.S. Pat. Nos. 3,920,933 (Moorehead); 3,941,950 (Dunwoodie et al); 3,944,914 (Simmons); 4,022,990 (Bauer); and 4,144,487 (Pharney). The Dunwoodie et al patent discloses a portable telephone test instrument, including the use of LED's to indicate certain characteristics of the tested circuit. There is a visual indication of the presence and polarity of direct current in the line under test. An LED will provide an indication when a proper connection has been made through the central office switching equipment. The device enables the communicating state of the telephone circuit under test to be monitored while simultaneously conducting a quality test of the circuit. External power is supplied to the device. In Simmons the device detects the existence of physical faults such as shorts, grounds, opens and the like. The test circuit periodically electrically charges and discharges each line to determine the distributed capacitance of each pair, which is then compared with the capacitance of other pairs of conductors to reveal any faults in the conductors. The Bauer test apparatus enables determination of an open or break in a wire of the telephone cable and provides information as to the location of the open condition on the cable. The Pharney apparatus locates faults such as high resistance leaks in telephone lines and simultaneously repairs the fault by means of a weld created between the conductors at the fault location.

Notwithstanding the foregoing prior art, there still exists a need for relatively simple, self-contained, portable test instrument which preferably uses power supplied by the telephone lines under test and provides an indication of, among other things, the direction of the fault.

SUMMARY OF THE INVENTION

The present invention has the advantage of providing needed information in order to determine the responsibility for maintenance of a particular circuit or piece of equipment being tested. It allows the telephone service subscriber to test most of the basic circuitry in the equipment which he has placed on the telephone line, as well as to determine that no physical wiring faults exist on the line which could interrupt the service, before calling the telephone company for repair service. The present test instrument provides these and other advantages in a single package and further, minimizes the need for any significant amount of knowledge in order to operate and interpret the results of the test. According to the present test instrument, the desired conditions will be indicated by a simple "yes" or "no". Moreover, there is no need for batteries, since the present instrument uses the power supply of the normal line voltage which is provided by the telephone company. There are no mechanical parts provided in the test instrument other than simple switches and there is no need for calibration or any significant amount of maintenance. The present device can be connected into the circuit and used only when needed. This invention relies primarily on the fact that any fault which might interrupt service will have some current drain on the system. The current drain or the lack thereof is identified, as well as its polarity. With this information, the present test instrument provides a simple "yes" or "no" indication as to whether the circuit is good or at fault. It has the advantage that the output may be switched on and off, and the input and output can be tested without removing anything from the line or making any other changes in the line itself. The device has a self-contained test unit to identify the type and direction of the fault, as well as a jack for emergency use in the event the fault is located on the output terminals. The jack then is used to plug in a standard telephone set that can be used until the fault is removed. It can check the telephone company supplied voltage for the proper voltage level and polarity and also the output for any physical faults or opens. The output circuit of the device will detect current flow or lack thereof. If the telephone circuit is not being used, no DC current will flow. If a physical fault such as a ground short, etc. exists, then current will flow. This is detected by the LED's and transistors in the circuitry employed by the present device and is indicated in the form of a visual display. A reversing switch also is provided to permit for testing of the normal capacitor associated with the telephone set to show whether or not the line is open. This capacitor will be charged and discharged by means of the reversing switch. The current used to charge and discharge the capacitor can be observed by the LED display indication. The input circuit of the instrument uses a voltage divider network as a resistive load on the input side to enable the connection of two LED's The LED's will identify the polarity and amount of the supplied voltage. If there is insufficient voltage or current, the diodes will not light.

A circuit in accordance with the present invention employs a voltage divider network for properly biasing a pair of interconnected PNP-NPN transistors. The base of each transistor is connected to the output of the test instrument through light-emitting diodes. The collector circuits of both transistors also contain light-emitting diodes. The emitter-to-base current is used to supply the output test voltage, such that if a solid short is placed across the telephone line, both transistors will turn on. Since the flow of current is greater in that case, the light-emitting diodes in the base circuits also will light because of the amount of current flowing in the circuit, thus providing a visual display. If there is a high resistance short circuit, then only the collector diodes will light up due to the relatively low emitter-to-base current flow. Foreign potentials on the output of the instrument are identified similarly by the appropriately biased transistors. Alternating current present across the output terminals is identified by means of the light-emitting diode connected through a capacitor across the output terminals. An auxially jack connection also is provided to permit normal telephone usage when the fault exists on the output of the device. When the unit is in its "on" position, the fault is removed from the line, allowing normal telephone service to exist at this jack on the instrument.

The foregoing and other objects, features, and advantages of a fault detector instrument according to the present invention will be better understood from the following illustration and description of a preferred embodiment of the present invention.

BRIEF DESCRIPTION OF THE DRAWING

A circuit for a test instrument in accordance with the present invention is illustrated in the single FIGURE.

DESCRIPTION OF PREFERRED EMBODIMENT

As illustrated in the drawing, there is shown a test circuit, including a pair of input terminals $R_{in}$, $T_{in}$, connected by means of an on-off switch $S_1$ to output terminals $R_{out}$, $T_{out}$. The switch $S_1$ in its "on" position, will open the telephone line and connect the output terminals to a reversing switch $S_3$ which, in turn, connects the output terminals to the base circuits of a pair of interconnected PNP and NPN transistors $Q_1$ and $Q_2$ respectively. There is provided a further switch $S_2$, which is a center off two-position, non-locking type switch. When $S_2$ is disposed in a first position 1, it connects the negative input terminal $R_{in}$ to a voltage divider circuit comprising series connected resistors $R_o$ and $R_1$, a pair of opposed LED's $D_1$ and $D_o$ connected in parallel relation across the resistor $R_1$, and terminal $T_{in}$ to $R_o$, to provide a polarity indicator. If the polarity is indicated as correct and there is sufficient voltage and current, then the diode $D_o$ will light. If the polarity is in a reverse direction, then the diode $D_1$ will light. If there is insufficient voltage or current at the input, then neither of the diodes will light and no further tests can be made. The switch $S_2$ also is designed (in position 1) to connect the negative input terminal $R_{in}$ to the diode $D_{11}$ connected between switch $S_2$ and the emitter of $Q_1$. This places a negative voltage on the output terminal $R_{out}$, which is connected through resistor $R_9$, diode $D_9$, and the base-emitter circuit of transistor $Q_1$ (the base-emitter circuit) to diode $D_{11}$. If there is a relatively low resistance ground or a positive voltage at the output, then current flows through this circuit and $D_9$ will light. However $Q_1$ does not turn on in this mode of operation. This test for positive potential at the output is further described hereinafter. The switch $S_3$ can reverse the output terminals in order to check for positive potential on the other output terminal. When the switch $S_2$ is placed in its other extreme position (i.e. position 2), this will connect the negative input terminal $R_{in}$ to the diode $D_{11}$ and the positive input terminal $T_{in}$ to the resistor $R_{11}$. The voltage divider circuit comprising series connected resistors $R_{11}$, $R_{12}$ and $R_{13}$ is connected between switch $S_2$ and the emitter of $Q_1$ and the voltage from company telephone lines is now connected to the voltage divider circuit. The collector of $Q_1$ is biased from the voltage divider circuit as illustrated in the drawing. Analyzing the circuit, the voltage across $R_{13}$ appears across the collector and emitter of $Q_1$. If a relatively more positive voltage is applied to the base of $Q_1$, $Q_1$ will turn on and current flow between the the collector and emitter of $Q_1$ will cause diode $D_8$ to light. Diode $D_9$ will light if sufficient current flows between the base and emitter of $Q_1$. $R_{12}$ and $R_{13}$ are connected across the collector-emitter circuit of the transistor $Q_2$ with its emitter being connected at the junction between $R_{11}$ and $R_{12}$, and the collector connected in series with diode $D_6$ and resistor $R_6$ to the junction of the resistor $R_{13}$ with the emitter of $Q_1$ and diode $D_{11}$. The base of transistor $Q_2$ is connected by means of diode $D_7$ and resistor $R_7$ the reversing switch $S_3$. The voltage divider circuit comprising $R_{11}$, $R_{12}$, and $R_{13}$ supplies voltage for the transistors $Q_1$ and $Q_2$. The connection of the base $Q_2$ to the output terminal through diode $D_7$ and the base of the transistor $Q_1$ through diode $D_9$, together with series resistors $R_7$ and $R_9$, respectively, limit current flow in the base circuits of each transistor. In the event that the output terminal connected to $Q_2$ is slightly more negative than the base of $Q_2$ then the diode $D_7$ will conduct but will not light. As the negative voltage is increased, the transistor $Q_2$ will turn on and the diode $D_6$ will light. The collector of transistor $Q_1$ is connected through series resistor $R_8$ and diode $D_8$ to the junction of voltage divider resistors $R_{12}$ and $R_{13}$. The transistor $Q_1$ and diodes $D_9$ and $D_8$ operate similarly to the circuit for $Q_2$ when the output terminal is positive. When a telephone set is placed on the line, the diodes $D_9$ and $D_8$ and $D_7$ and $D_6$ will light if there is an off-hook condition, that is the receiver is picked up (a call is made or answered). In the case of an on-hook condition, that is the receiver is in the normal condition (ready to receive a call) the reversing operation of switch $S_3$ between terminals 1 and 2 will charge and discharge the capacitor in the set connected n series with the bases of transistors $Q_1$ and $Q_2$. This, in turn, will cause a flashing of diodes $D_6$ and $D_8$. If there is an alternating current voltage present across the output terminals, this is indicated when the diode $D_5$ lights through the capacitor $C_1$, which are series-connected across the output terminals. In the case of a resistance appearing across the output terminals, this would cause a current to flow from the base of transistor $Q_1$ to the base of transistor $Q_2$ and is indicated by the lighting of the base and collector light-emitting diodes $D_6$ and $D_8$, or $D_6$, $D_8$, $D_9$ and $D_7$, depending upon the amount of current flow. In the event that a fault appears on the output terminal, then a connecting point at auxiallary jack terminals $J_1$ on the input side of the test instrument allows the normal use of the line with the switch $S_1$ placed in its on position (terminals 2) while the fault is being corrected.

When the test circuit is in its normal position, the switch $S_1$ will be disposed in its off position as shown by the contact terminals 1. This condition of the switch connects the input terminals $R_{in}$, $T_{in}$ directly to the output terminals $R_{out}$, $T_{out}$. When the switch is moved into its on position in contact with switch contact terminals 2, the output terminals are disconnected from the input terminals. The jack terminals $J_{in}$ are, as usual, connected to the input $R_{in}$ and $T_{in}$. In this arrangement the output terminals are connected to a test circuit which can test for any foreign potentials (e.g. through the series connection of $R_9$, $D_9$ and the emitter-base junction of $Q_1$ and $R_{13}$ and $R_{12}$, emitter-base junction of $Q_2$, and $D_7$ and $R_7$) which appear across the output terminals. For example, if the positive potential is on output terminal 2 and negative potential on output terminal 1, $D_7$ and $D_9$ will light, then the diode $D_5$ will light identifying that AC voltage is present across the terminals. Switch $S_3$ can be used to reverse the output terminals to determine the other polarity voltages which may appear across those terminals.

With the switch $S_1$ in its on position in contact with terminals 2 and the switch $S_2$ in its position in contact with terminals 1, this connects the input to a test circuit comprising resisters $R_o$ and $R_1$, and diodes $D_o$ and $D_1$. This circuit can be used to test the input for proper voltage and polarity. It also connects the output to a test circuit comprising $R_9$, $D_9$, $Q_1$, and $D_{11}$. This test is used to test the output for positive potential and by reversing switch $S_3$, the other output terminal will be tested. The presence of a negative potential also can be determined. The operation of switch $S_2$ to position 2 will place a positive potential on the emitter of transistor $Q_2$ through $R_{11}$, and $D_7$ will conduct through $R_7$. This will turn on $Q_2$ lighting $D_6$ with $Q_2$ being forward biased by voltage divider $R_{11}$, $R_{12}$ and $R_{13}$. The operation of switch $S_3$ will test the other output terminal.

The test circuit can be used to determine whether an open or resistance exists across the output terminals or a foreign body (such as metal, water, or other conductive materials) exists across the output. For this arrangement the switch $S_1$ is located in its on position in contact with terminals 2. The switch $S_2$ then is disposed in its position in contact with contact terminals 2. In this arrangement a voltage divider network including the resistors $R_{11}$, $R_{12}$, and $R_{13}$ is connected for biasing the emitted-collector circuits of the transistors $Q_1$ and $Q_2$. The transistor $Q_2$ will turn on when the output terminal is negative and the transistor $Q_1$ will turn on if the output terminal is positive. The switch $S_3$ can be used to reverse the output terminals to test if the polarity is reversed across the output terminals. If there is a short circuit or resistance across the output terminals then the transistors $Q_1$ and $Q_2$ both will turn on. This will be indicated by a display panel on the test instrument. The switch $S_3$ can be used to charge and discharge the capacitance on the output terminals which will turn on $Q_1$ and $Q_2$. When switch $S_3$ is operated it will discharge the capacitance in the circuit through the test. This will flash $D_6$ and $D_8$ or $D_6$, $D_8$, $D_7$ and $D_9$ depending on the amount of capacitance in the circuit. Repeating the operation of switch $S_3$ will produce this display.

There has been described and disclosed herein a test instrument device which is used to indicate wiring and station equipment faults on telephone lines as well as the direction of such faults. By locating the device in the telephone line at the point where the user has responsibility, it can be employed to determine the proper procedure for correction of the fault. This device can be either portable or wired to a distribution panel or single line circuit. It does not require an internal source of power. Instead it uses the normal power supply of the telephone lines under test and the currents on the output terminals. For the indication of the fault on the output, light emitting diodes are employed to provide visual display and the device also indicates proper polarity in the presence of line voltage and available current on the input terminals. This device also indicates the presence of a circuit or the lack of one on the output terminals. A visual display will indicate the presence of a voltage on the output terminals, the ground resistance or capacitance across the output as well. If the fault is on the output terminals then the tester can be left in its on position to permit the circuit to be restored to normal service while the fault can be removed at a subsequent time. Various options and alternatives and other arrangements and modifications will be apparent to those skilled in the art upon review of the present disclosure, without departing from the spirit and scope of the invention. The scope of the invention is thus to be understood as limited only as defined in the accompanying claims.

What is claimed is:

1. A telephone test apparatus for use in determining faults and the direction thereof in a subscriber's telephone lines comprising:

input circuit means including input terminals and jack terminals, a plurality of light-emitting diodes connected in parallel opposed relation, and voltage divider circuit means, means operatively connecting said voltage divider circuit means with said diodes such that said diodes can indicate the polarity of supplied voltage to said apparatus from said telephone lines, and first switch means with a first pair of terminals for connecting said input terminals and said jack terminals to said plurality of diodes and said voltage divider circuit means; and output circuit means including output terminals and a pair of transistors, means connecting said transistors with a second pair of terminals of said first switch means; said transistors each having first, second and third electrodes; diode means connecting said second electrode of a first of said transistors to said third electrode of the second of said transistors; further voltage divider means, means connecting said further voltage divider means with said transistors and with said second pair of terminals for supplying voltage from said input terminals to said transistors; and reversing switch means connected to said first electrodes of said transistors and to said output terminals for enabling determination of an open condition in said subscriber's telephone line.

2. The telephone test apparatus according to claim 1 including further switch means for selectively connecting said output terminals from said input terminals and said jack terminals directly to said reversing switch means.

3. The telephone test apparatus of claim 1 wherein said further voltage divider means is connected between the second pair of terminals of said first switch means, and the second electrode of said second transistor is connected to a first portion of said further voltage divider means and a second portion of said further voltage divider means is connected across the second and third electrodes of said second transistor.

4. The telephone test apparatus of claim 3 including a series connected resistor and light-emitting diode connecting the third electrode of said first transistor to a point on said portion of said further voltagee divider means.

5. The telephone test apparatus of claim 1 wherein a series circuit comprising a resistor and a light-emitting diode is connected between the first electrode of each of said transistors and said reversing switch.

6. The telephone test apparatus of claim 1 wherein said first electrode comprises a transistor base and including a series connected capacitor and light-emitting diode connected across the base circuits of said transistors and adapted for connection across said output terminals.

7. The telephone test apparatus according to claim 1 wherein the power for said apparatus is supplied externally of said unit by the telephone lines connected to said input terminals.

* * * * *